(12) United States Patent
Donohue et al.

(10) Patent No.: US 12,375,436 B2
(45) Date of Patent: Jul. 29, 2025

(54) CROSS-NETWORK TEXT COMMUNICATION MANAGEMENT SYSTEM

(71) Applicant: CALLFIRE, INC., Santa Monica, CA (US)

(72) Inventors: Shannon Elizabeth Donohue, Playa del Rey, CA (US); Vijesh Rajnikant Mehta, Culver City, CA (US); Norman William Happ, Los Altos, CA (US); Aaron Horvath, Ladera Ranch, CA (US)

(73) Assignee: Callfire, Inc., San Francisco, CA (US)

( * ) Notice: Subject to any disclaimer, the term of this patent is extended or adjusted under 35 U.S.C. 154(b) by 0 days.

(21) Appl. No.: 18/628,257

(22) Filed: Apr. 5, 2024

(65) Prior Publication Data

US 2024/0340258 A1  Oct. 10, 2024

Related U.S. Application Data

(63) Continuation of application No. 17/449,075, filed on Sep. 27, 2021, now Pat. No. 11,956,194, which is a
(Continued)

(51) Int. Cl.
*H04L 51/212* (2022.01)
*H04L 51/56* (2022.01)
*H04W 4/14* (2009.01)

(52) U.S. Cl.
CPC ............ *H04L 51/212* (2022.05); *H04L 51/56* (2022.05); *H04W 4/14* (2013.01)

(58) Field of Classification Search
CPC ....... H04L 51/21; H04L 51/212; H04L 51/56; H04W 4/14
See application file for complete search history.

(56) References Cited

U.S. PATENT DOCUMENTS

9,807,228 B1 10/2017 Chiang
9,942,182 B2 4/2018 Skudlark et al.
(Continued)

*Primary Examiner* — Wayne H Cai
(74) *Attorney, Agent, or Firm* — Knobbe Martens Olson & Bear, LLP (57) ABSTRACT

A text communication management system is provided that receives, analyzes, and enforces recipient actions regarding phone-based text communications. The text communication management system can obtain recipient action data regarding a recipient's action with respect to a particular text communication, and enforce the recipient action with respect to future text communications. The management system can also or alternatively analyze the recipient action data in connection with recipient action data from multiple other recipients to generate a model for use in determining whether future phone-based text communications should be permitted, determining the likelihood that such communications will cause recipients to opt-out, and the like. Third parties, such as phone service carriers and text communication originating entities, may access the management system via an application programming interface ("API") to submit data regarding recipient actions, initiate analysis of a potential text communication using the model, and the like.

20 Claims, 7 Drawing Sheets

Related U.S. Application Data continuation of application No. 17/301,667, filed on Apr. 9, 2021, now Pat. No. 11,165,731.

(60) Provisional application No. 63/008,452, filed on Apr. 10, 2020.

(56) References Cited

U.S. PATENT DOCUMENTS

| | | |
|---|---|---|
| 2014/0004892 A1 | 1/2014 | Murynets et al. |
| 2014/0179360 A1 | 6/2014 | Jackson et al. |
| 2014/0379819 A1 | 12/2014 | Chestnut et al. |
| 2015/0319586 A1 | 11/2015 | Jin et al. |
| 2019/0065777 A1* | 2/2019 | Ravuvari ............ H04W 12/02 |
| 2019/0147403 A1 | 5/2019 | Lawrence et al. |
| 2020/0195604 A1 | 6/2020 | Haasan et al. |
| 2021/0168567 A1* | 6/2021 | Mouline ............... H04W 4/06 |
| 2021/0185078 A1 | 6/2021 | Sjouwerman |

* cited by examiner

CROSS-NETWORK TEXT COMMUNICATION MANAGEMENT SYSTEM

CROSS-REFERENCE TO RELATED APPLICATION

This application is a continuation of U.S. patent application Ser. No. 17/449,075, filed Sep. 27, 2021 which is a continuation of U.S. patent application Ser. No. 17/301,667, filed Apr. 9, 2021, which claims priority to U.S. Provisional Patent Application No. 63/008,452, filed Apr. 10, 2020, the contents of each of which are incorporated by reference herein and made part of this specification.

BACKGROUND

Electronic devices may be used to exchange information over communication networks. For example, a mobile phone may be used to generate a text communication (also referred to as a short message service message or "SMS" message). The mobile phone may send the text communication to another mobile phone over the public switched telephone network ("PSTN"). A user of the other mobile phone can view the text communication and respond with a text communication reply, if desired. Some mobile phones are configured to send and/or receive images, video, and other media information in addition to text communications. For example, some mobile phones may generate and transmit multimedia messaging service ("MMS") communications to other mobile devices.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF ILLUSTRATIVE EMBODIMENTS

The present disclosure is directed to a text communication management system that receives, analyzes, and enforces recipient actions regarding phone-based text communications. One entity may originate a phone-based text communication (e.g., short message service or "SMS" message) that is transmitted to a recipient device. The operator of the recipient device may initiate an action indicating an opt-in or opt-out from future phone-based text communications. The future text communications that are the subject of the recipient action may be communications from the same entity, similar communications from other entities, or some combination thereof. The text communication management system can obtain recipient action data regarding the recipient's action and enforce the recipient's action with respect to future phone-based text communications. The text communication management system can also or alternatively analyze the recipient action data with recipient action data from multiple other recipients to generate a model, such as a model for use in determining whether future phone-based text communications should be permitted, determining the probability that such communications will cause recipients to opt-out, and the like. Third parties, such as phone service carriers and text communication originating entities, may access the text communication management system via an application programming interface ("API") to submit data regarding recipient actions, initiate analysis of a potential text communication, and the like. In this way, the text communication management system may serve as a centralized system for text communication opt-in actions, opt-out actions, enforcement thereof, and predictive analysis thereof-independent of the phone service carrier, text communication originating entity, and text communication recipient.

Some conventional systems allow recipients of phone-based text communications to reply with an indication that the recipient does not wish to receive future phone-based text communications from the particular entity that originated the text communication. For example, the recipient may reply with a keyword, such as "STOP," to opt-out of all phone-based text communications from the text communication originating entity (also referred to simply as an "originating entity" for convenience). However, such a protocol does not allow for fine-grained control over which types of phone-based text communications that the recipient wishes to opt-out of, nor does the procedure allow recipients to opt-in to future phone-based text communications of a type that the originating entity has not yet sent to the recipient. In addition, the procedure is limited to a single recipient and a single originating entity, without providing an opportunity to apply the recipient action to future phone-based text communications, to other originating entities, and/or to other recipients. Furthermore, such a procedure relies on the originating entity to comply with the recipient's action, leaving open the possibility of an originating entity not necessarily complying with the recipient's action. Even if a recipient blocks future text communications from an originating entity by adding the originating entity's contact information to a blacklist on the recipient's device, an originating entity may change contact information and continue to send phone-based text communications that make it through to the recipient's device.

Some aspects of the present disclosure relate to providing text communication recipients and originating entities with fine-grained control over future text communications. When an originating entity initiates a text communication via the text communication management system (also referred to simply as the "management system" for convenience), the management system may include option data that the recipient can use to take action with respect to future text communications. In some embodiments, the option data may represent a customized link, such as a uniform resource locator ("URL") or other uniform resource identifier ("URI") to a network resource (e.g., a web page). The customized link may be customized in the sense that it includes one or more parameters, such as parameters identifying the specific recipient, originating entity, and/or communication to which the link applies. When the recipient activates the link, the management system can use the parameters to match the action with the corresponding item or items (e.g., specific recipient, originating entity, and/or communication). The management system can then record the recipient's action. For example, activation of the link without additional input may indicate that the user wishes to opt-out of future text communications from the originating entity. In some embodiments, the management system may provide to the recipient, in response to activation of the link, a web page that includes input fields for specifying additional details regarding the recipient's action. For example, the web page may include input fields for specifying which types of communications the recipient may wish to continue receiving, a reason for opting out of text communications, and the like. In this way, the management system can provide the recipient with more granular control of opting into and out of communications.

Additional aspects of the present disclosure relate to the management system providing an API that third parties can use to interact with the management system. In some embodiments, third parties such as originating entities or phone service carriers may submit data regarding recipient actions taken with respect to text communications that are not sent by the management system. The management system can therefore collect recipient action data from and about a larger population of originating entities and recipients, serve as a central location for maintaining recipient opt-in and opt-out data, etc. In some embodiments, third parties can request the management system to provide details about whether a particular recipient has opted into or out of text communications of a particular type and/or from a particular originating entity. For example, the management system may collect recipient action data via a first channel of communication, such as via the internet or another packet-switched network (e.g., via a web page or a recipient action data submission API). The data may be provided by recipient devices, originating entities, and/or from third parties. The management system may then provide details and/or analysis of the recipient action data with respect to communications that are to be sent via a second channel of communication that is different than the first channel, such as phone-based text communications sent via the public switched telephone network.

Further aspects of the present disclosure relate to analyzing the data regarding recipient actions to detect patterns, make determinations, enforce opt-in/opt-out actions across different originating entities, and/or take related actions. In some embodiments, the management system can detect when an originating entity, from which a recipient has opted-out of receiving text communications, is attempting to send a text communication to the recipient using different source contact information (e.g., a different "from" phone number). For example, the management system may access information about originating entities, such as unique identification numbers (e.g., federal tax identification numbers) to determine the originating entity of a text communication, rather than relying on source contact information alone. In this way, the management system can therefore determine the originating entity independent from the source contact information currently being used by the originating entity, and can therefore access past recipient actions taken with respect to the originating entity even if the recipient actions were initiated in response to a text communication sent using different source contact information. In some embodiments, the management system may analyze information about recipient actions and communications to which the actions apply, and generate a model that can be used to identify particular types of communications. For example, the management system may use machine learning to train a model to classify communications in different content-based classifications (e.g., notifications, promotions, etc.). The content-based classifications can be used to enforce recipient opt-in/opt-out actions, to identify originating entities that are not complying with the opt-in/opt-out actions, etc. In some embodiments, the management system may analyze information about recipient actions and communications to which the actions apply, and generate a model that can be used to identify risk factors and/or predict future opt-in/opt-out actions. For example, the management system may use machine learning to train a model to classify communications as potentially fraudulent, malicious, or likely to result in an opt-out recipient action. The risk-based classifications can be used to prevent high-risk communications from being sent, to identify originating entities that are attempting to send high-risk communications, to detect security events, etc.

Various aspects of the disclosure will now be described with regard to certain examples and embodiments, which are intended to illustrate but not limit the disclosure. Although aspects of some embodiments described in the disclosure will focus, for the purpose of illustration, on particular examples of devices, networks, text communication classifications, and artificial intelligence/machine learning algorithms, the examples are illustrative only and are not intended to be limiting. In some embodiments, the techniques described herein may be applied to additional or alternative devices, networks, text communication classifications, artificial intelligence/machine learning algorithms, and the like.

Network-Based Messaging Environment

Figure 1:
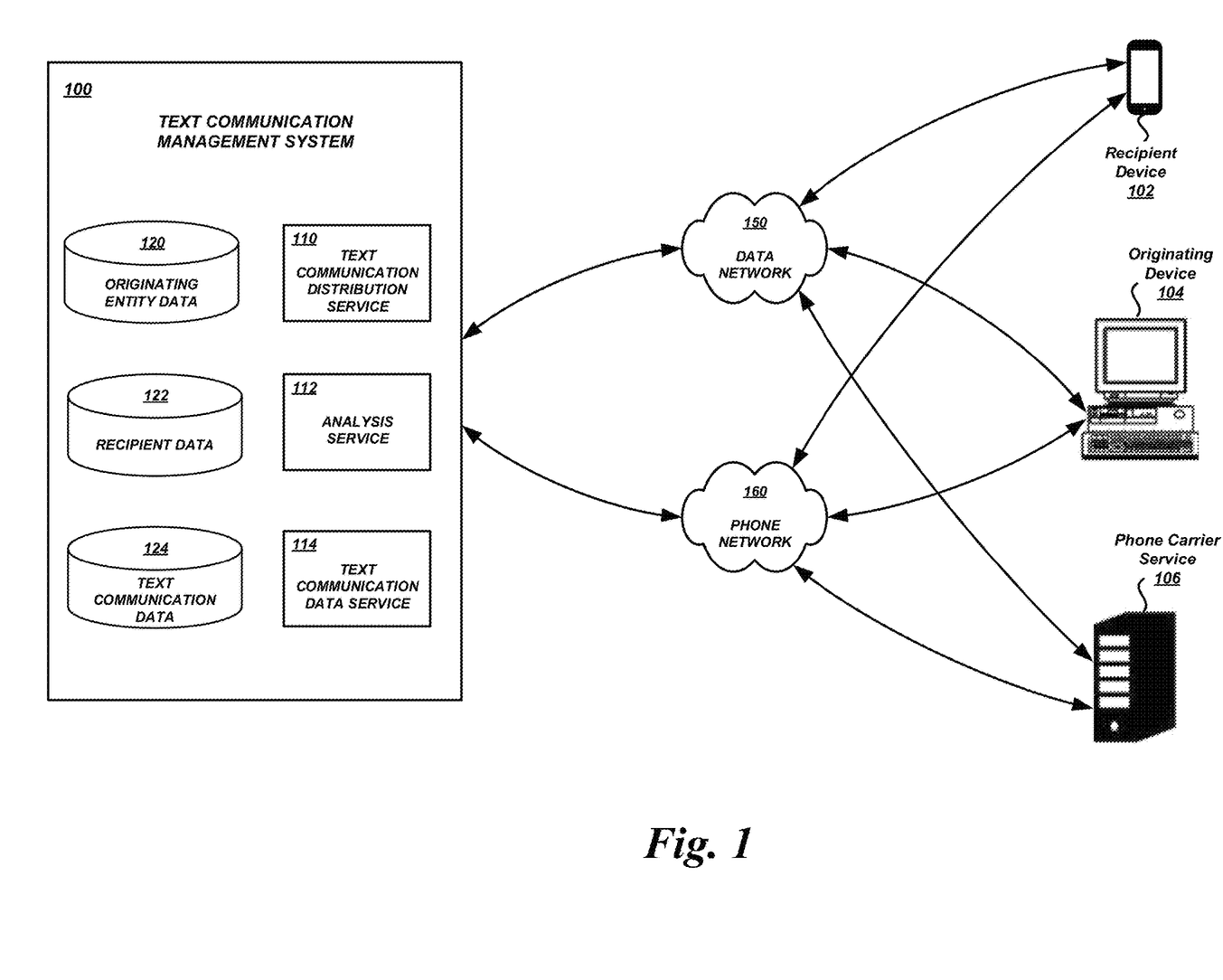
FIG. 1 is a block diagram of an illustrative text communication management system and various recipient devices, phone service carriers, text communication originating entities, and communication networks according to some embodiments.

With reference to an illustrative embodiment, FIG. 1 shows a network environment in which aspects of the present disclosure may be implemented. As shown, the network environment may include a text communication management system 100, and various recipient devices 102, originating entities 104, and phone service carriers 106. The management system 100, recipient devices 102, originating entities 104, and phone service carriers 106 may communicate with each other via one or more communication networks 150, 160.

In some embodiments, communication network 150 may be a packet-switched data network. Illustratively, communication network 150 may be a publicly-accessible network of linked networks, possibly operated by various distinct parties, such as the Internet. In some cases, the network 150 may include a private network, personal area network, local area network, wide area network, cable network, satellite network, cellular data network, etc., or a combination thereof, some or all of which may or may not have access to and/or from the Internet.

In some embodiments, communication network 160 may be a circuit-switched network or other telephone network. For example, communication network 160 may be a publicly-accessible telephone network, such as the public switched telephone network ("PSTN"). In some cases, the communication network 160 may be or include a private telephone network, such as a private branch exchange ("PBX").

Communication network 150 may be referred to as a "data network" to highlight its use as a network for transmitting bit-encoded data, and communication network 160 may be referred to as a "phone network" to highlight its use as a network for transmitting telephone communications such as text communications. In some embodiments, however, communication network 150 may also be used to transmit phone-based communications, and/or it may include an analog network. Likewise, in some embodiments communication network 160 may also be used to transmit bit-encoded data, and/or it may include a packet-switched data network.

The management system 100 may include various components for providing the features described herein. Illustratively, the management system 100 may include a text communication distribution service 110 to distribute text communications to recipient devices 102 on behalf of originating entities 104. The management system 100 may also include an analysis service 112 to analyze text communications and data regarding recipient actions taken with respect to text communications, detect patterns in the recipient action data, create models for use in predicting future recipient actions, and the like. The management system 100 may also include a text communication data service 114 to receive data from third parties regarding recipient actions, and to provide data to third parties regarding recipient opt-in and opt-out actions, results of analyzing recipient action data, and the like.

The management system 100 may also include various data stores for maintaining data to facilitate the functionality and provide the services of the management system 100. For example, the management system 100 may include an originating entity data store 120 for storing data regarding originating entities 104 (e.g., contact information, identity information, etc.). The management system 100 may also include a recipient data store 122 for storing data regarding recipient devices, operators of recipient devices, recipient actions taken with respect to text communications, etc. The management system 100 may also include a text communication data store 124 for storing data regarding text communications handled by the management system 100, text communications against which recipients have taken action, etc.

The example components and data stores of the management system 100 shown in FIG. 1 are illustrative only, and are not intended to be limiting. In some embodiments, a management system 100 may have fewer, additional, and/or alternative components and data stores.

The management system 100 may be implemented on one or more physical server computing devices that provide computing services and resources to recipient devices 102, originating entities 104, and phone service carriers 106. In some embodiments, the management system 100 (or individual components thereof, such as the text communication distribution service 110, analysis service 112, text communication data service 114, originating entity data store 120, recipient data store 122, text communication data store 124, etc.) may be implemented on one or more host devices, such as blade servers, midrange computing devices, mainframe computers, desktop computers, or any other computing device configured to provide computing services and resources. For example, a single host device may execute one or more components of a text communication distribution service 110, analysis service 112, text communication data service 114, originating entity data store 120, recipient data store 122, text communication data store 124, some combination thereof, etc. The management system 100 may include any number of such hosts.

In some embodiments, the features and services provided by the management system 100 may be implemented as web services consumable via one or more communication networks. In further embodiments, the management system 100 (or individual components thereof) is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

The individual recipient devices 102 may be any of a wide variety of electronic communication devices configured to or otherwise capable of receiving text communications, such as SMS communications. For example, recipient devices 102 may include mobile telephones, landline telephones, personal computing devices, wearable computing devices, and various other electronic devices and appliances. Some mobile telephones may be capable of executing application software and accessing a packet switched data network, such as a local area network ("LAN") or the internet. Such mobile telephones may be referred to as "smart phones." In one specific non-limiting embodiment, a recipient device 102 may be a smart phone configured to send and receive SMS communications via one or more phone networks (e.g., the PSTN), and also configured with application software, such as a browser application, to request, receive, and send data via one or more data networks (e.g., the internet). Although the term "recipient" may be used herein with reference to the entity or person that receives text communications, the term "recipient" may also be used to refer to the recipient device 102 that is operated by the entity or person.

The individual originating entities 104 may be any of a wide variety of entities that initiate the sending of text communications to recipient devices 102. For example, an originating entity 104 may be a business that sends notifications, service information, promotions, or the like to recipient devices. As another example, an originating entity 104 may be a single user of a recipient device 102, and thus the group of recipient devices 102 may include devices operated by originating entities (and vice versa). Although the term "originating entity" may be used herein with reference to the business entity or person that wishes to send text communications to recipient devices 102, the term "originating entity" may also be used to refer to the device or system from which a text communication (or a request to send a text communication) originates. In some embodiments, an originating entity 104 may be or include any of a wide variety of electronic communication devices, including mobile devices (e.g., cellular and other mobile phones, smart phones, media players, handheld gaming devices, etc.), personal computing devices, terminal computing devices, laptop computing devices, tablet computing devices, electronic reader devices, wearable computing devices, server computing devices, midrange computing devices, mainframe computing devices, and various other electronic devices and appliances.

The individual phone service carriers 106 may be any of a wide variety of entities that provide access to—and facilitate communication via—networks such as a phone network 160. For example, a phone service carrier 106 may provide text communication services to subscribers, such as operators of recipient devices 102 and originating entities 104. Although the term "phone service carrier" may be used herein with reference to the entity that provides access to phone networks, the term "phone service carrier" may also be used to refer to the device or system through which phone network traffic is managed. In some embodiments, a phone service carrier 106 may include any of a wide variety of telecommunication systems, including systems of telephone exchanges, switches, or the like. Some such telecommunication systems may include various computing devices, such as server computing devices, midrange computing devices, mainframe computing devices, and various other electronic devices and appliances.

A recipient may have or acquire a phone service carrier account and associated phone number. The associated phone number may be assigned to one or more recipient devices 102. Such a phone number may be referred to as a "recipient phone number." Phone-based communications, such as text communications, may be sent to the recipient device 102 by addressing the communications to the recipient phone number.

An originating entity 104 may also have or acquire a phone service carrier account and associated phone number. Phone-based communications, such as text communications, sent by the originating entity 104 are associated with the phone number of the originating entity. Such a phone number may be referred to as a "source phone number." The source phone number is included in or otherwise associated with text communications as an indication of the origin of the text communications.

Communications through the phone network 160 may be handled by one or more phone service providers 106. The phone service providers 106 use the associated phone numbers—both the recipient phone number and the source phone number—for routing of the communications, tracking account usage, billing, and the like. Although certain phone-based communications such as voice phone calls may be permitted on the phone network 160 without an authenticated or otherwise verifiable source phone number, phone-based text communications may not be so permitted. Rather, an authenticated or otherwise verifiable source phone number, associated with an existing phone service carrier account of an originating entity 104, may be required in order to transmit each text communication via the phone network 160. In this way, each text communication transmitted via the phone network 160 can be tied to an originating entity 104.

Example Recipient Action Data Processing

Figure 2:
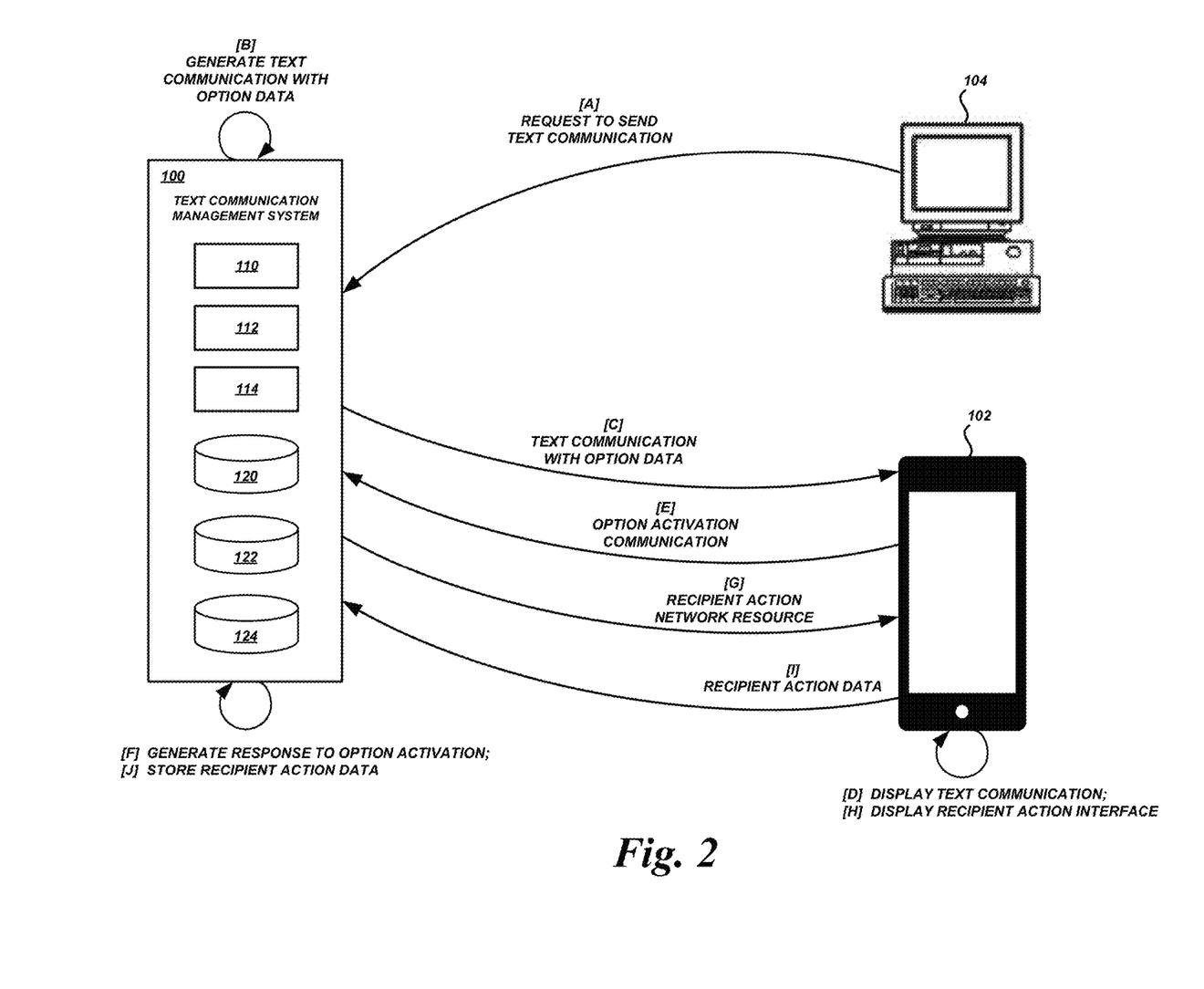
FIG. 2 is a block diagram of various data flows and interactions between the text communication management system, a text communication originating entity, and a recipient device in connection with a text communication recipient action according to some embodiments.

FIG. 2 shows example data flows and interactions between the management system 100, a recipient device 102, and an originating entity 104 in connection with sending a text communication to the recipient device 102, and processing recipient action data with respect to the text communication. Advantageously, by using the management system 100 as an intermediary, any prior recipient actions with respect to text communications from the originating entity 104, or similar text communications from other originating entities, may be enforced even if the originating entity does not comply or is not aware of the prior recipient actions.

At [A], an originating entity 104 can initiate a text communication to a recipient device 102. The originating entity may address the text communication to the recipient phone number of the recipient device 102, or the originating entity may request the management system 100 to generate the text communication on behalf of the originating entity 104. The text communication may include a payload of text content to be sent to the recipient phone number. In some embodiments, the originating entity 104 may provide the text content to the management system 100 with a request to send a text communication to the recipient phone number (or to a set of recipient phone numbers). In some embodiments, the text content may be provided to the management system 100 separately from a request to send a text communication. For example, the originating entity 104 may have an account with the management system 100 and may have provided or selected one or more templates or other items of text content to be sent to recipient phone numbers. When a text communication is to be sent, the originating entity 104 can provide an identifier of the text content to be sent, along with a recipient phone number or recipient data (e.g., an identifier) from which a recipient phone number can be derived (e.g., from a record in the recipient data store 122).

At [B], the management system 100 can generate a text communication to be sent to the recipient phone number. The text communication may be an SMS communication that includes text content provided by or identified by the originating entity 104. The management system 100 may also generate option data that the recipient can use to take action with respect to the text communication. The option data can be included with the text content in the text communication that is sent to the recipient phone number. Upon receipt of the text communication, the recipient can then use the option data to take action, such as by opting into or out of future text communications that may be similar to the current text communication, opting into or out of future text communications from the current originating entity, etc. To facilitate such actions, the option data may be customized for the current text communication. For example, the option data may identify or otherwise reference the originating entity, the recipient phone number, the source phone number, the text content, other attributes of the text communication, or some combination thereof. In some embodiments, the option data may be data used to display a hyperlink on the recipient device 102. The hyperlink may have embedded parameters identifying various attributes of the text communication. For example, the option data may be a uniform resource identifier ("URI"), such as a uniform resource locator ("URL") that corresponds to a web page or other network resource hosted by or otherwise capable of being processed by the management system 100.

At [C], the management system 100 can send the text communication, including option data, to the recipient device 102 associated with the recipient phone number. Illustratively, the text communication may be sent as an SMS communication via the phone network 160.

Figure 3A:
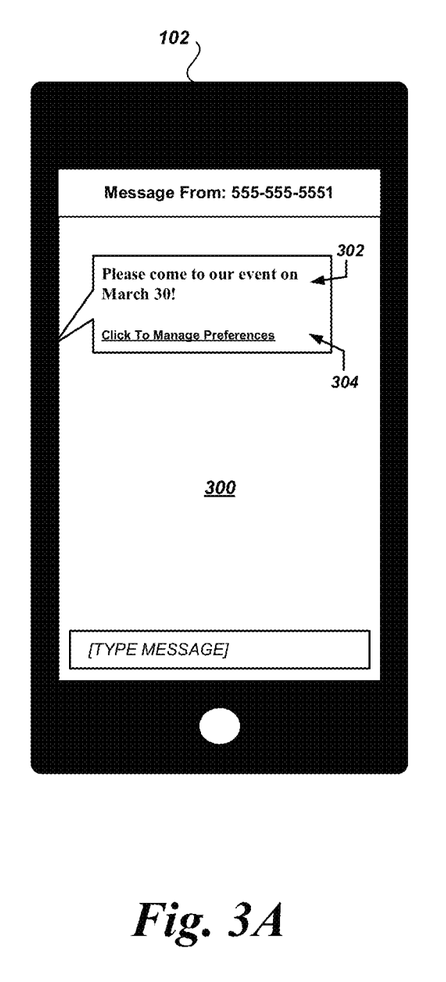
FIGS. 3A and 3B are diagrams of recipient device user interfaces presenting text communications and communication management options according to some embodiments.

At [D], the recipient device 102 associated with the recipient phone number may receive and display the text communication. The text content may be displayed on a display screen of the recipient device 102. FIG. 3A shows an example text communication display interface 300 that is used by a recipient device 102 to present text communications. In some embodiments, as shown, the text content 302 of a text communication may be presented. In addition, the option data 304 may be displayed. If the option data is a URL, the option data may be displayed as a selectable hyperlink. A recipient may take action with respect to the text communication using the option data. For example, the hyperlink may be displayed with a prompt regarding how the recipient may take action, such as "Click To Manage Preferences" or "Click Here To Opt-out Of Future Communications."

At [E], the recipient has activated the option data and an option activation communication may be sent to the management system 100. If the option data was a URL displayed as a hyperlink, then activation of the hyperlink may cause a request for a network resource to be sent to the management system 100. The request may include parameters that were embedded into the query string of the URL, such as identifiers for the recipient phone number, originating entity, text content, a timestamp, other attributes of the text communication, or some combination thereof. In addition, clicking a hyperlink to send a request may also cause information about the recipient device 102 to be sent with the request separately from parameters embedded in the query sting. For example, the option activation communication may include headers or other metadata with information about the recipient device 102, such as device type, operating system, installed browser application, software versions, etc.

In some embodiments, the option activation communication may be sent to the management system 100 via a different communication channel, using a different communication protocol, than the text communication that was received by the recipient device 102. For example, the option activation communication may be sent as a hypertext transfer protocol ("HTTP") request via the data network 150. In some embodiments, the option activation communication may be sent to the management system 100 using the same communication channel as the text communication. For example, the option activation communication may be sent as an SMS communication, such as a "STOP" message that may or may not include additional information (e.g., parameters, metadata, etc.).

At [F], the management system 100 can receive the option activation communication from the recipient device 102 and generate a response. In some embodiments, the response may be a network resource, such as a hypertext markup language ("HTML") file representing a web page. The response may be generated such that the recipient can take granular actions associated with the text communication, instead of being limited to simply stopping all text communications from the originating entity. In some embodiments, the response may include a listing of communication classifications that the user can opt into or out of. For example, individual text communications may be classified into one or more of a predefined set of classifications. In one specific embodiment, the set of classifications may include "promotion," "service" "alert," and "information." The response may include a listing of these classifications, with one or more user interface elements (e.g., checkboxes, radio buttons, drop-down lists, etc.) to opt into and/or out of future text communications associated with the various classifications. The response may also include a user interface element to indicate whether the various opt-in and/or opt-out actions are to apply to only the current originating entity, or to all text communications regardless of originating entity.

To generate the response, the management system 100 can determine the value of parameters included in the option activation communication to determine the communication to which the option activation applies. For example, the management system 100 may access the query string of the URL and resolve the value of embedded parameters, such as a text communication identifier. The text communication identifier can be used to access information about the text communication, such as information from the text communication data store 124. In some embodiments, data regarding the text communication sent to the recipient phone number may be stored in the text communication data store 124. The information may include an originating entity identifier, the source phone number, the recipient phone number, the text content, etc. In this way, the management system 100 can determine the particular text communication, originating entity, recipient, etc. to which the option activation communication applies and for which the response is being generated.

At [G], the management system 100 can send, to the recipient device 102, a reply to the option activation communication. In some embodiments, the response may be a network resource, such as a web page as described in greater detail above.

Figure 3B:
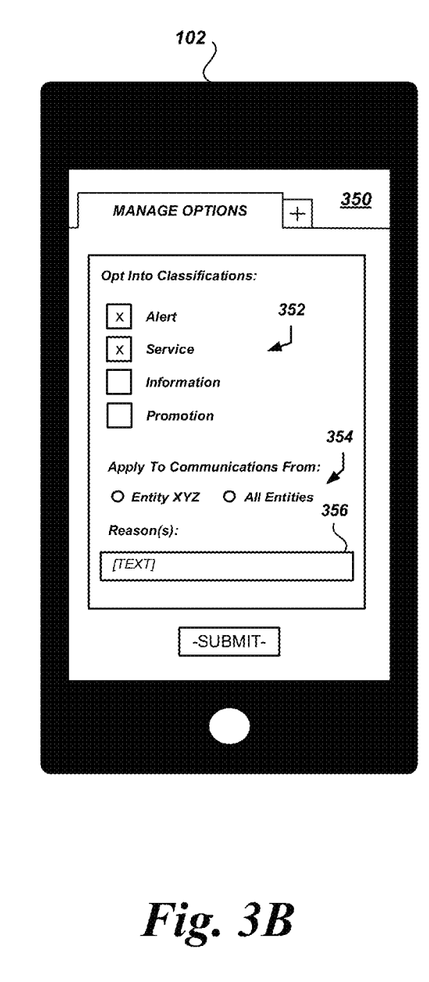

At [H], the recipient device 102 can receive and display the response to the option activation communication. In some embodiments, if the response is a web page, the recipient device 102 can process and display the web page using application software such as a browser application. FIG. 3B shows an example of a web page interface 350 that may be used to generate recipient action data. In some embodiments, as shown, the web page interface 350 may include a classification portion 352 for opting into and/or out of text communications in particular classifications, such as "promotion," "service" "alert," and "information." The web page interface 350 may include an entity portion 354 for applying the opt-in/opt-out selections to only the originating entity for the text communication from which the current recipient action process was initiated, or to all entities. The web page interface 350 may include a reason portion 356 for the recipient to provide information regarding the reason that they are taking the action. The user can then interact with the web page interface 350, such as by activating user interface controls, entering data, and the like. Such interactions may cause generation of recipient action data. The recipient action data may be data that represents user opt-in actions, opt-out actions, and the like.

At [I], the recipient device 102 may send recipient action data to the management system 100. In some embodiments, if the recipient action data is generated based on user interaction with a network resource such as a web page, the recipient action data may be sent as an HTTP POST transmission over data network 150. In some embodiments, recipient action data may be sent using a different protocol or a different communication channel. For example, the recipient device 102 may generate an SMS communication with a payload that represents the recipient action data.

At [J], the management system 100 can receive the recipient action data from the recipient device 102 and store it for use in enforcing the recipient's actions with respect to future text communications. In some embodiments, the recipient action data—or data derived therefrom—may be stored in the recipient data store 122.

Example API for Submission of Third-Party Recipient Action Data

Figure 4:
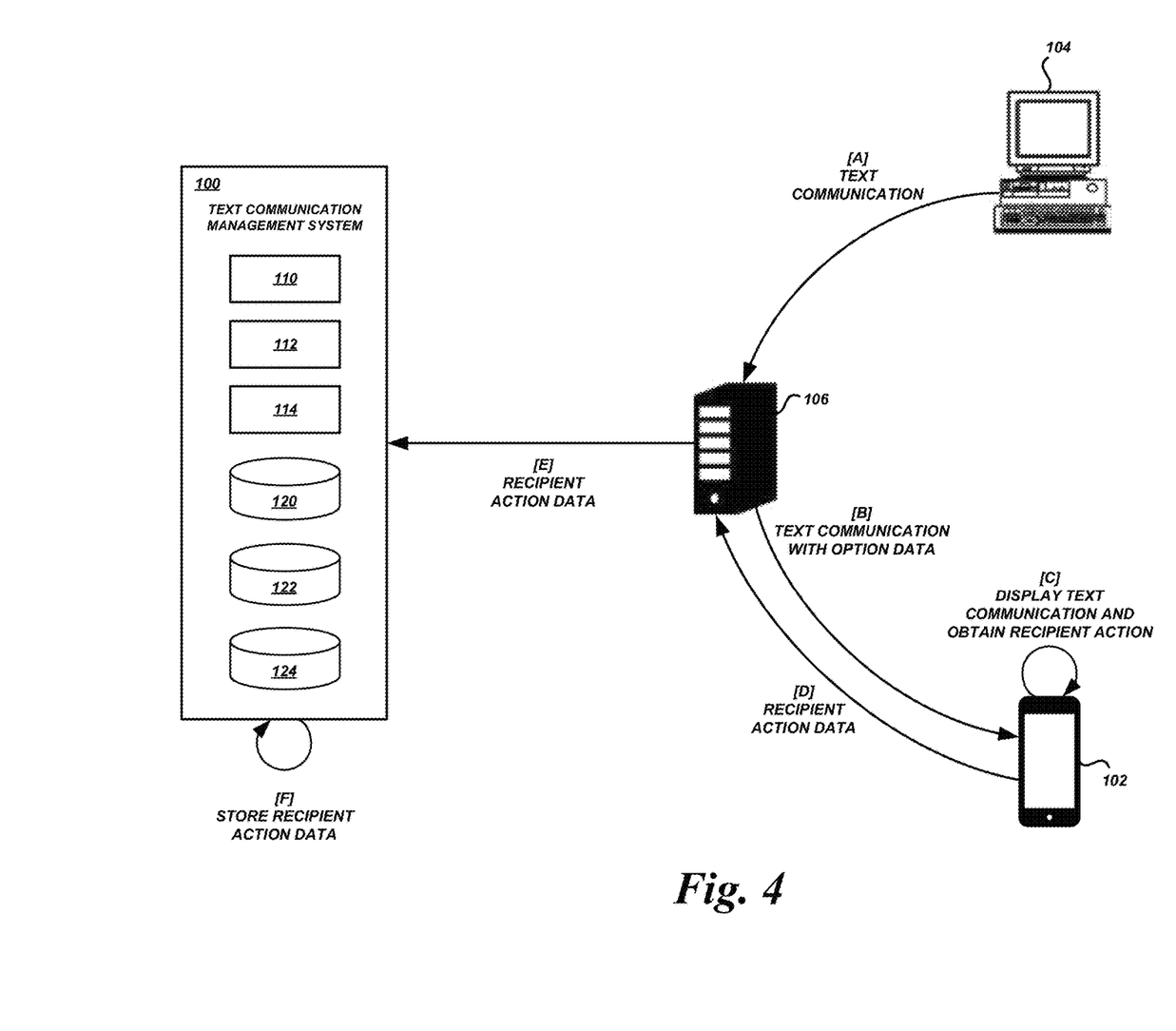
FIG. 4 is a block diagram of various data flows and interactions between the text communication management system, a text communication originating entity, a phone service carrier, and a recipient device in connection with a text communication recipient action according to some embodiments.

FIG. 4 shows example data flows and interactions between the management system 100, a recipient device 102, an originating entity 104, and a phone service carrier 106 in connection with sending a text communication to the recipient device 102, and processing recipient action data with respect to the text communication. Advantageously, the management system 100 may expose an API to receive recipient action data from third parties regarding text communications that are not sent via the management system 100, and therefore the management system 100 may collect additional recipient action data for use in analysis procedures described in greater detail below. In addition, the management system 100 may serve as a centralized management system for enforcing—or helping third parties to enforce—recipient action data, as described in greater detail below.

At [A], an originating entity 104 can initiate a text communication to a recipient device 102. The originating entity 104 may address the text communication to the recipient phone number of the recipient device 102, or the originating entity 104 may request a third party—such as a phone service carrier 106—to generate the text communication on behalf of the originating entity 104. Illustratively, the text communication may include a payload with text content, and may include option data, as described in greater detail above. The originating entity 104 may generate and include the option data, or the phone service carrier 106 (or another third party) may generate and include the option data in the text communication.

At [B], if the text communication is being sent via a third party such as a phone service carrier 106, the third party may send the text communication to the recipient device 102 associated with the recipient phone number.

At [C], the recipient device 102 can display the text communication and option data, and receive user interactions with the option data. As described above, such interactions may result in a network resource being requested and received, and the recipient may interact with the network resource to initiate granular opt-in and/or opt-out actions with respect to future text communications. The network resource may be generated and/or provided by the third party (phone carrier service 106), the originating entity 104, or some other entity. In some embodiments, the network resource may be generated and provided by the management system 100 using an API exposed by the management system. For example, the option data that is included in the message may refer to a network resource generated or otherwise provided by the management system 100, even though the option data itself may be generated or otherwise provided to the recipient device by the phone carrier service 106 or originating entity 104.

At [D], the recipient device 102 can send recipient action data representing recipient opt-in, opt-out, and/or other such actions to the phone service carrier 106 or other entity that provided option data or a corresponding network resource. For example, the recipient device 102 can send an HTTP POST response or an SMS communication with recipient action data.

At [E], the phone service carrier 106 (or other third party that receives the recipient action data from the recipient device 102, such as originating entity 104) can send recipient action data to the management system 100. The management system 100 may expose an API that trusted third parties (e.g., third parties with which the management system 100 has an established relationship or to whom the management system 100 has provided security credentials) can use to submit recipient action data. Illustratively, the API may include a function that includes one or more parameters corresponding to one or more items of recipient action data. When a third party calls the function, the third party can pass recipient action data in the parameter(s). In some embodiments, the API may include a function through which a third party may provide a file or stream of recipient action data. The file or stream may include recipient action data from a single recipient device 102 interaction, or a batch of interactions from one or more recipient devices.

At [F], the management system 100 may store the recipient action data received from the third party, or data derived therefrom. In some embodiments, the management system 100 may store the recipient action in a data store such as the recipient data store 122 and/or the text communication data store 124.

Example API for Third Party Access

Figure 5:
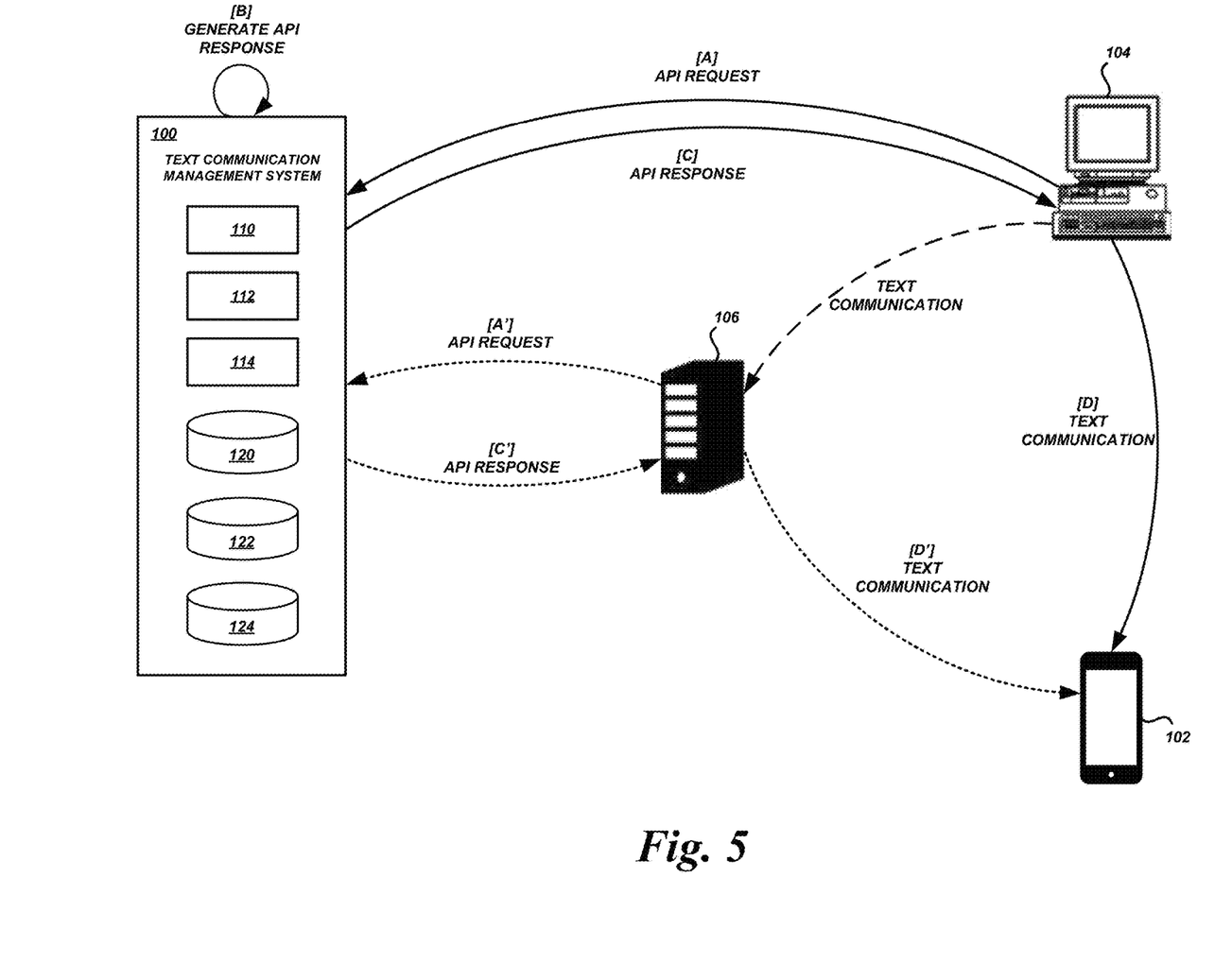
FIG. 5 is a block diagram of various data flows and interactions between the text communication management system, a phone service carrier, and a text communication originating entity in connection with managing distribution of a text communication according to some embodiments.

FIG. 5 shows example data flows and interactions between the management system 100, a recipient device 102, an originating entity 104, and a phone service carrier 106 in connection with determining whether to send text communication(s) and/or what text communication(s) to send. The determinations may be based on recipient action data received from recipient devices 102 directly and/or via third parties, as described in greater detail above. Advantageously, the management system 100 may make certain determinations and/or provide certain data based on attributes of the originating entity, recipient, and/or text communication to be sent. In addition, the output of the management system 100 may be generated using analytical models that are learned from data regarding prior text communications, recipient action data, and the like. In this way, the management system 100 can dynamically detect and respond to changes in originating entity, recipient, and/or text communication attributes, while also enforcing existing recipient actions.

At [A], an originating entity 104 can access the management system 100 via an API exposed by the management system 100. The originating entity 104 may wish to initiate a text communication to a particular recipient phone number. The originating entity 104 may first use the API to determine whether a recipient associated with the recipient phone number has opted into or out of communications of the type that the originating entity 104 plans to send, and/or communications from the originating entity 104 altogether. The originating entity 104 may provide a request to the management system 100, such as by calling a function to obtain information. In some embodiments, calling the function may include providing the recipient phone number, the source phone number, the text content, a classification of the text communication, other attributes of the text communication, or some combination thereof.

In some embodiments, instead of (or in addition to) the originating entity 104 accessing the management system 100 via the API, a different entity may access the management system 100 via the API at [A']. For example, a phone service carrier 106 may access the management system 100 via the API to determine whether a text communication, initiated by an originating entity 104, should be sent to the recipient phone number, or whether some other action is to be been taken. The phone service carrier 106 may provide a request to the management system 100, such as by calling a function to obtain information regarding the recipient phone number. In some embodiments, calling the function may include providing the recipient phone number, the source phone number, the text content, a classification of the text communication, other attributes of the text communication, or some combination thereof.

At [B], the management system 100 can generate a response to the API request. The response may include one or more data items indicative of various determinations or results of data analyses associated with the API request. In some embodiments, the response may include data items representing whether prior recipient action data relevant to the API request has been obtained by the management system 100, an opt-in and/or opt-out action represented by the recipient action, a probability that a text communication will cause an opt-out, etc.

For example, the management system 100 may determine that no opt-in has been provided by the recipient for the current classification of text communication and/or for text communications from the current originating entity 104. If the management system 100 determines that no such opt-in has been provided, the management system 100 may generate an API response indicating that the text communication is not to be sent, or that the text communication is to be sent with a request to opt-in.

As another example, the management system 100 may determine that an opt-out has been provided by the recipient for the current classification of text communication and/or for text communications from the current originating entity 104. If the management system 100 determines that such an opt-out has been provided, the management system 100 may generate a response indicating that the text communication is not to be sent. The management system 100 may determine that the opt-out has been provided with respect to the originating entity 104 even if the originating entity 104 is currently using different a different source phone number than a source phone number that may have been used to send a prior text communication that preceded the recipient's opt out. Illustratively, the management system 100 may access a database of originating entity information that associates originating entities with identifiers that do not change or that change infrequently, such as unique identification numbers (e.g., federal tax identification numbers). Such identifiers may remain the same for an originating entity even if the originating entity changes source phone numbers or uses a different source phone number selected from a pool. By determining the identifier for the originating entity that is going to originate a text communication to a recipient device 102, the management system 100 can determine whether opt-out or other recipient action data exists for the originating entity, independent of the source phone number currently being used.

As a further example, the management system 100 may determine that the text communication is associated with a degree of risk that satisfies a criterion. A degree of risk may represent the probability that a text communication is fraudulent or malicious. If the degree of risk satisfies a criterion (e.g., exceeds or otherwise satisfies a threshold), then the management system 100 can generate an API response indicating that the text communication is not to be sent. A degree of risk may also or alternatively represent the probability that a text communication will cause a recipient to opt-out of similar text communications and/or all text communications from the originating entity. If the degree of risk satisfies a criterion (e.g., exceeds or otherwise satisfies a threshold), then the management system can generate an API response indicating the risk of a recipient opt-out action.

As an additional example, the management system 100 may detect a pattern of text communications of the current classification and/or from the current originating entity 104 resulting in opt-out recipient actions, such as a threshold amount or percentage of such opt-outs from the current recipient device 102 and/or other recipient devices. As a result, the management system 100 may generate a result indicating the current text communication is not to be sent, or indicating a probability that sending the text communication will result in an opt-out recipient action.

Figure 6:
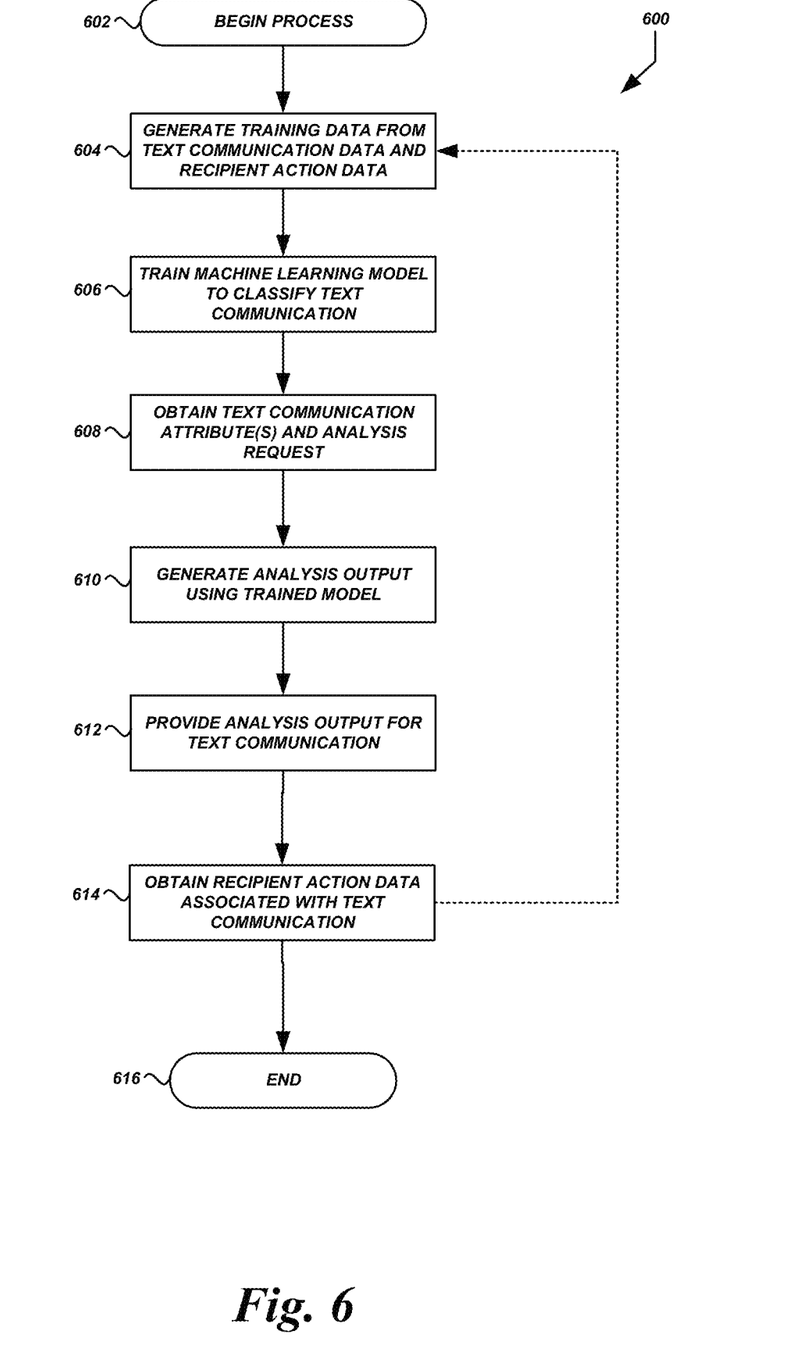
FIG. 6 is a flow diagram of an illustrative process for analyzing attributes of text communication recipient action data, recipient devices, originating entities, etc. and making determinations based on the analysis according to some embodiments.

In some embodiments, the management system 100 may analyze data provided with—or otherwise associated with—the API request using a model or set of rules. The result of the analysis may be a score, classification, or flag. For example, the result may include, or be based on, an analysis and classification of the text content to be sent, attributes of the originating entity, attributes of the recipient device, or the like. One example of a routine for generating and using a model is shown in FIG. 6 and described in greater detail below.

At [C], the management system 100 may provide output of the API request to the originating entity 104. In some embodiments, the output may represent the result of one or more of the analyses described above. For example, the result may be a score indicating a degree to which the management system 100 is confident in an opt-in, opt-out, or classification determination. As another example, the result may be a flag indicating whether the text communication is permitted to be sent.

In some embodiments, instead of (or in addition to) the output of the API request being sent to the originating entity 104 accessing the management system 100 via the API, the output may be provided to a different entity may access the management system 100 via the API at [C']. The output may represent the result of one or more of the analyses described above. For example, the result may be a score indicating a degree to which the management system 100 is confident in an opt-in, opt-out, or classification determination. As another example, the result may be a flag indicating whether the text communication is permitted to be sent.

At [D], the originating entity 104 can send a text communication to the recipient device 102 based on the API response received from the management system 100. For example, the API response may indicate a low probability that the text communication will result in an opt-out. As another example, the API response may be a flag indicating that no opt-out of text communications of the present classification and/or from the present originating entity 104 has been received, or a flag indicating the recipient has expressly opted into text communications of the present classification and/or from the present originating entity 104.

In some embodiments, a third party can proceed with sending a text communication to the recipient device 102 on behalf of the originating entity 104 based on the API response received from the management system 100. For example, the phone carrier service 106 may determine that the text communication received from the originating device 104 and destined for the recipient device 102 is permitted to be sent based on the API response received from the management system 100. The phone carrier service 106 may proceed with sending the text communication at [D']. In this example, the phone carrier service 106 may use the analysis of the management system 100 to shield recipients on the network of the phone carrier service 106 (e.g., recipients with phone service carrier accounts managed by the phone service carrier 106) from text communications that are malicious, likely to prompt an opt-out, or from which the recipient has already opted out.

Example Process for Analyzing Recipient Action Data

FIG. 6 is a flow diagram of an illustrative process 600 that may be executed by a management system 100 to analyze data associated with text communications. Advantageously, the process 600 can apply various methods, such as machine learning, to learn patterns from the data and generate models of the data for use in determining probable aspects of future text communications.

The process 600 begins at block 602. The process 600 may begin in response to an event, such as when the management system 100 receives a corpus of recipient action data or other data, or upon instruction from a system administrator. When the process 600 is initiated, a set of executable program instructions stored on one or more non-transitory computer-readable media (e.g., hard drive, flash memory, removable media, etc.) may be loaded into memory (e.g., random access memory or "RAM") of a computing device of the management system 100. The executable instructions may then be executed by a hardware-based computer processor (e.g., a central processing unit or "CPU") of the computing device. In some embodiments, the process 600 or portions thereof may be implemented on multiple processors, serially or in parallel.

At block 604, the management system 100 can generate training data from text communication data and recipient action data. In some embodiments, generating training data may include labeling text communications based on recipient action data that is generated after recipients receive the text communications. For example, a text communication that results in recipient action data representing an opt-out of promotions may result in labeling the text communication as a promotion. As another example, a text communication that results in recipient action data representing an opt-out of receiving future text communications of any kind from the originating entity may be labeled as a text communication that causes opt-out actions. The example text communication labels and methods of generating training data are illustrative only, and are not intended to exhaustive, required, or limiting.

At block 606, the management system 100 can train a model (or generate a new model) based on the data generated above. In some embodiments, the model may be a classification model, such as a neural network-based classifier, that classifies data based on a probability of being within or not within one or more classes. For example, the model may classify text communications as being in one or more of a set of content-based classes such as alert, information, promotion, or service. As another example, the model may classify text communications as likely to cause opt-in or opt-out recipient actions. Training the model can include initializing model parameters, generating classification scores for individual items of training data, and adjusting the model parameters based on a loss function and desired output (e.g., labels associated with the text communications during the training data generation phase) so that future classification scores will be closer to the desired output.

With reference to an illustrative embodiment, the model may be trained to generate a score indicating the likelihood or confidence that a recipient will or will not perform a particular operation, such as an opt-in or opt-out action, with respect to a particular text communication. Input data for such a model may include data representing a text communication to be analyzed (e.g., the text communication for which a prediction or other score is to be generated) and data that represents prior actions of the recipient (e.g., the data on which the recipient's likelihood to perform opt-in and/or opt-out actions with respect to particular messages can be based). For example, the input may be a vector, matrix, or other tensor comprising data representing the current text communication, data representing the content, classification, and/or source of prior text communications that have been sent to the recipient, and/or data representing the recipient's actions (if any) taken with respect to the prior text communications. Thus, the model may have information from which a prediction or other score can be generated on a recipient-specific basis. In some embodiments, the data representing the prior text communications and/or prior actions of the recipient may be provided in encoded form, such as a word embedding or sentence embedding representing the content of individual prior text communications, and data representing corresponding actions of the recipient taken with respect to the individual prior text communications. The content of the current text communication may or may not be similarly encoded for input into the model. In some embodiments, encoded recipient data such as a recipient embedding may be trained to represent an individual recipient and their opt-in and/or opt-out actions with respect to prior text communications. The recipient embedding for a particular recipient may be input into the model in connection with a current text communication to be analyzed and from which a prediction or other score can be generated. If the model is implemented as an artificial neural network, the input (e.g., the vector, matrix, or other tensor) may be processed in a forward pass to generate one or more output values. An output value may be a score indicating a likelihood that the recipient will opt-into or opt-out of future text communications from the sender of the current text communication and/or of future text messages of the same type as the current text communication.

To train such a model, a corpus of text communication processing data regarding text communications sent to recipients and the corresponding recipient actions may be obtained and used to generate training data input (e.g., vector, matrix, or other tensor) for the model. The actual recipient action that was performed by the recipient in response to a given text communication may be known, and may serve as reference data output for the particular training data input. The training data input for the text communication and prior text communications (e.g., additional vectors and/or a recipient embedding as described above) may be processed by the model in a forward pass, and the output may be compared to the reference data output using a loss function. Parameters of the model may be updated using the loss function, such as by using a gradient descent method, so that future output of the model for the training data input may be closer to the reference data output. The process may be repeated for any number of text communications and/or recipients until a stopping criterion is satisfied, such as a number of forward passes or training epochs, an amount of elapsed training time, and/or satisfaction of an accuracy metric.

At block 608, the management system 100 can receive a request to analyze various text communication attributes, such as attributes of a text communication that an originating entity or third party wishes to send to a recipient device. The request may include the content of the text communication to be sent, an identifier of the originating entity, an identifier of the recipient, other information, or some combination thereof. For example, if a third party is going to send a text communication to a recipient device on behalf of an originating entity, the third party may first request analysis of the text communication (or attributes thereof) by the management system 100. The third party may then determine whether to send the text communication based on the results of the analysis.

At block 610, the management system can analyze the text communication (or attributes thereof) using the trained machine learning model, and generate output of the analysis. In some embodiments, the output may be one or more classifications of the content of the text communication, a score indicating a likelihood that the text communication will result in an opt-in or opt-out action, a likelihood that the text communication will violate an opt-out recipient action, some combination thereof, or the like.

At block 612, the management system 100 can provide the output of the analysis generated using the trained model above. For example, the management system 100 can respond with a message, value, or other data regarding the analysis.

At block 614, the management system 100 can obtain recipient action data associated with the text communication that was the subject of the analysis process. In some embodiments, the recipient action data may be received from the recipient device, from the originating entity, or from a third party, as described herein. The process 600 may return to block 604 so that the model can be trained using the recipient action data. For example, the training process may be performed for each n items of recipient action data obtained (wherein n is a positive number), for each n units of time passed since the last training process, on demand, or in response to some other event. The process 600 may end at block 616.

Example Computing Device

Figure 7:
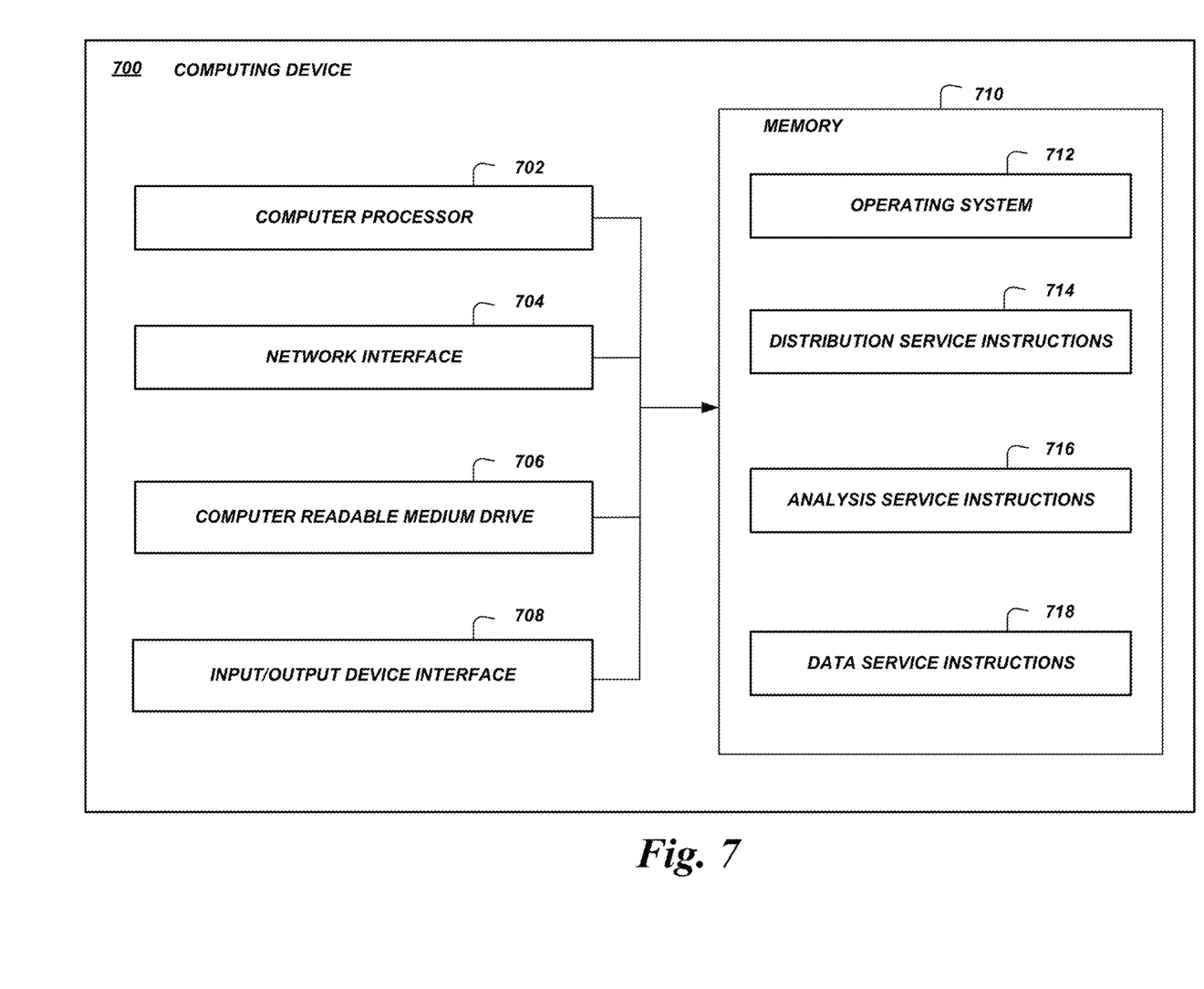
FIG. 7 is a block diagram illustrating components of a computing device configured to execute processes for managing text communications and recipient actions according to some embodiments.

FIG. 7 illustrates the various components of an example computing device 700 configured to implement some or all of the functionality of the text communication management system 100. In some embodiments, as shown, the computing device 700 may include: one or more computer processors 702, such as physical central processing units ("CPUs"); one or more network interfaces 704, such as a network interface cards ("NICs"); one or more computer readable medium drives 706, such as a high density disks ("HDDs"), solid state drives ("SSDs"), flash drives, and/or other persistent non-transitory computer-readable media; an input/output device interface 708, such as an IO interface in communication with one or more microphones; and one or more computer readable memories 710, such as random access memory ("RAM") and/or other volatile non-transitory computer-readable media.

The computer readable memory 710 may include computer program instructions that one or more computer processors 702 execute in order to implement one or more embodiments. The computer readable memory 710 can store an operating system 712 that provides computer program instructions for use by the computer processor(s) 702 in the general administration and operation of the computing device 700. In some embodiments, the computer readable memory 710 can further include computer program instructions and other information for implementing aspects of the present disclosure. For example, in one embodiment, the computer-readable memory 710 may include distribution service instructions 714 for implementing aspects of the text communication distribution service 110, analysis service instructions 716 for implementing aspects of the analysis service 112, and data service instructions 718 for implementing aspects of the text communication data service 114.

TERMINOLOGY

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method for managing phone-based text communications, the computer-implemented method comprising:

as implemented by a computing system comprising one or more computer processors configured to execute specific instructions, receiving a first phone-based text communication associated with a first source phone number, wherein the first phone-based text communication is received from an originating entity associated with the first source phone number, a second source phone number, and a unique identifier, and wherein the first phone-based text communication is addressed to a recipient phone number;

sending the first phone-based text communication using the recipient phone number;

receiving, in response to sending the first phone-based text communication, recipient action data representing an opt-out action associated with the recipient phone number and the originating entity;

updating originating entity information associated with the unique identifier to indicate the opt-out action associated with the recipient phone number;

receiving a second phone-based text communication associated with the second source phone number, wherein the second phone-based text communication is addressed to the recipient phone number; and determining not to send the second phone-based text communication based at least partly on the originating entity information.

2. The computer-implemented method of claim 1, further comprising determining a classification of the first phone-based text communication, wherein determining to send the first phone-based text communication is based further on the classification.

3. The computer-implemented method of claim 2, wherein determining the classification comprises determining that text content of the first phone-based text communication is not classified as one of: alert, information, promotion, or service.

4. The computer-implemented method of claim 1, further comprising:

providing an application programming interface ("API") to a phone carrier service, wherein the API comprises a function by which the phone carrier service submits recipient action data regarding the first phone-based text communication.

5. The computer-implemented method of claim 1, further comprising:

providing an application programming interface ("API") to a recipient entity associated with the recipient phone number, wherein the API comprises a function by which the recipient entity submits the recipient action data regarding the first phone-based text communication.

6. The computer-implemented method of claim 1, wherein the unique identifier is a federal tax identification number stored in an originating entity information database of the computing system.

7. The computer-implemented method of claim 1, wherein the unique identifier remains constant for the originating entity regardless of source phone number.

8. The computer-implemented method of claim 1, further comprising accessing the originating entity information to determine the unique identifier associated with the second phone-based text communication.

9. The computer-implemented method of claim 8, further comprising determining that the unique identifier associated with the second phone-based text communication is associated with the originating entity.

10. The computer-implemented method of claim 9, further comprising determining not to send the second phone-based text communication based at least partly on the opt-out action associated with the recipient phone number and the originating entity.

11. A system comprising computer-readable memory and one or more processors programmed by executable instructions in the computer-readable memory to at least:
   receive a first phone-based text communication associated with a first source phone number, wherein the first phone-based text communication is received from an originating entity associated with the first source phone number, a second source phone number, and a unique identifier, and wherein the first phone-based text communication is addressed to a recipient phone number;
   send the first phone-based text communication using the recipient phone number;
   receive, in response to sending the first phone-based text communication, recipient action data representing an opt-out action associated with the recipient phone number and the originating entity;
   update originating entity information associated with the unique identifier to indicate the opt-out action associated with the recipient phone number;
   receive a second phone-based text communication associated with the second source phone number, wherein the second phone-based text communication is addressed to the recipient phone number; and
   determine not to send the second phone-based text communication based at least partly on the originating entity information.

12. The system of claim 11, wherein the one or more processors are further programmed by the executable instructions to at least determine a classification of the first phone-based text communication, wherein determining to send the first phone-based text communication is based further on the classification.

13. The system of claim 12, wherein the one or more processors are further programmed by the executable instructions to at least determine the classification comprises determining that text content of the first phone-based text communication is not classified as one of: alert, information, promotion, or service.

14. The system of claim 11, wherein the one or more processors are further programmed by the executable instructions to at least:
   provide an application programming interface ("API") to a phone carrier service, wherein the API comprises a function by which the phone carrier service submits recipient action data regarding the first phone-based text communication.

15. The system of claim 11, wherein the one or more processors are further programmed by the executable instructions to at least:
   provide an application programming interface ("API") to a recipient entity associated with the recipient phone number, wherein the API comprises a function by which the recipient entity submits the recipient action data regarding the first phone-based text communication.

16. The system of claim 11, wherein the unique identifier is a federal tax identification number stored in an originating entity information database.

17. The system of claim 11, wherein the unique identifier remains constant for the originating entity regardless of source phone number.

18. The system of claim 11, wherein the one or more processors are further programmed by the executable instructions to at least access the originating entity information to determine the unique identifier associated with the second phone-based text communication.

19. The system of claim 18, wherein the one or more processors are further programmed by the executable instructions to at least determine that the unique identifier associated with the second phone-based text communication is associated with the originating entity.

20. The system of claim 19, wherein the one or more processors are further programmed by the executable instructions to at least determine not to send the second phone-based text communication based at least partly on the opt-out action associated with the recipient phone number and the originating entity.

* * * * *